(12) United States Patent
Bakker et al.

(10) Patent No.: US 7,857,126 B2
(45) Date of Patent: Dec. 28, 2010

(54) GUIDE, ASSEMBLED GUIDE AND DEVICE FOR CONDITIONING PRODUCTS DISPLACEABLE ALONG A GUIDE TRACK

(75) Inventors: Jaap Bakker, XN Uden (NL); Wilhelmus Johannes Everardus Maria Van De Dungen, PK Veghel (NL)

(73) Assignee: Stork Townsend B. V., Oss (NL)

( * ) Notice: Subject to any disclaimer, the term of this patent is extended or adjusted under 35 U.S.C. 154(b) by 27 days.

(21) Appl. No.: 10/561,759

(22) PCT Filed: Feb. 19, 2005

(86) PCT No.: PCT/NL2004/000126

§ 371 (c)(1),
(2), (4) Date: Jul. 28, 2006

(87) PCT Pub. No.: WO2004/113203

PCT Pub. Date: Dec. 29, 2004

(65) Prior Publication Data

US 2007/0056832 A1 Mar. 15, 2007

(30) Foreign Application Priority Data

Jun. 24, 2003 (NL) .................................. 1023736

(51) Int. Cl.
*B65G 15/62* (2006.01)
(52) U.S. Cl. ................... 198/841; 198/778; 198/840
(58) Field of Classification Search .............. 198/778, 198/840, 841
See application file for complete search history.

(56) References Cited

U.S. PATENT DOCUMENTS

| | | | | |
|---|---|---|---|---|
| 1,651,912 A | * | 12/1927 | Thompson | ................. 198/406 |
| 3,904,025 A | * | 9/1975 | Garvey | ........................ 198/778 |
| 4,269,302 A | * | 5/1981 | Garvey | ........................ 198/607 |
| 4,535,963 A | | 8/1985 | Lachonius | |
| 4,627,529 A | * | 12/1986 | Tarlton et al. | ................ 198/778 |
| 5,074,407 A | | 12/1991 | Brumby | |
| 5,590,757 A | | 1/1997 | Walter et al. | |
| 5,782,340 A | * | 7/1998 | Dolan | ......................... 198/841 |
| 6,474,463 B1 | | 11/2002 | Wolfel | |
| 6,620,737 B2 | * | 9/2003 | Saito et al. | ................... 438/714 |
| 6,796,418 B1 | * | 9/2004 | Harrison et al. | ............. 198/778 |
| 2002/0011400 A1 | * | 1/2002 | Burkhart et al. | ............. 198/818 |

FOREIGN PATENT DOCUMENTS

| | | |
|---|---|---|
| DE | 3437868 | 4/1986 |
| FR | 2695112 | 3/1994 |
| FR | 2735113 | 12/1996 |
| FR | 2836135 | 8/2003 |
| GB | 816291 | 7/1959 |
| GB | 1090630 | 11/1967 |

\* cited by examiner

*Primary Examiner*—Gene Crawford
*Assistant Examiner*—Kavel P Singh

(57) ABSTRACT

The invention relates to a guide for supporting a displaceable object, comprising: a plastic guide profile (1, 7, 16, 30) and a support structure (6, 12, 18, 32) supporting the guide profile, characterized in that the guide profile is engaged at least at two spaced-apart positions by the support structure, at least one engaging position of which consists of a free support (4, 5, 10, 11, 13, 14, 33, 34) of the guide profile on the support structure such that the freely supporting side of the guide profile is displaceable relative to the support structure. The invention also relates to a device (21) for conditioning products displaceable along a guide track (22).

19 Claims, 3 Drawing Sheets

GUIDE, ASSEMBLED GUIDE AND DEVICE FOR CONDITIONING PRODUCTS DISPLACEABLE ALONG A GUIDE TRACK

BACKGROUND OF THE INVENTION

The invention relates to a guide for supporting a displaceable object, comprising: a plastic guide profile, and a metal support structure supporting the guide profile. The invention also relates to an assembled guide provided with a plurality of guides according to the invention connecting onto each other. Finally, the invention further relates to a device for conditioning products displaceable along a guide track.

In the displacement of products at a production location or a location where the products are processed, large-scale use is made of guides over which the products can slide directly or via a product carrier. In order to control the friction resistance and wear, use is made in the prior art of metal guides which are partially covered by plastic guide profiles. The drawbacks of such guides covered with plastic is that they are relatively costly and are in addition difficult to clean, particularly at the position where the plastic guide profiles lie against the metal guide. This can result in problems in respect of hygiene, especially in conditions where perishable goods are present. A device for conditioning (food) products displaceable along a guide track should be particularly envisaged here, such as drying towers, cooling towers, freezing towers, smoking spaces, curing rooms, other cooling or heating spaces, and so on.

The invention has for its object to provide a guide and a device for conditioning products displaceable along a guide track which combines the advantages of the prior art guides and devices with better controllable hygienic conditions.

SUMMARY OF THE INVENTION

The invention provides for this purpose a guide profile as according to claim 1. The guide profile, which is at least substantially form-retaining, can thus be held in position without a contact surface of considerable size being required. The contact between the support structure and the plastic can be minimized with only a few placed-apart engaging positions. This enables a good cleaning of both components. A problem which can occur due to the small contact (in area) between the support structure, which will normally be manufactured from metal, and plastic is that the differing coefficients of expansion of the support structure and the plastic result in an uncontrollable orientation of the plastic guide part (guide profile) relative to the generally stationary support structure, particularly in conditions of changing temperatures. However, the free support obviates this problem of controllable orientation of the guide profile as a result of only limited contact between support structure and plastic guide profile. When the guide profile is coupled rigidly on one side to the support structure, the orientation of the guide profile is fixed on one side, and all relative deformation of the guide profile which occurs relative to the support structure is compensated by the free support. Free support is here understood to mean a support where the relative orientation is not fixed; the separate elements are displaceable relative to each other.

In order to also control the orientation of the guide profile (particularly in directions other than the longitudinal direction of the guide profile) as well as possible at the position where it supports freely on the support structure, in a preferred variant the guide profile is provided with a three-dimensional contact surface, and/or the support structure is provided with a three-dimensional contact surface at the position where the guide profile supports freely thereon. The ability to control the relative positioning of the guide profile and the support structure is increased by making use of a one or two-sided three-dimensional contact surface.

In a particular preferred variant, the free support of the guide profile on the support structure is formed by a recess in the guide profile in which an engaging part of the support structure engages close-fittingly and displaceably. A free space can herein be enclosed between the engaging part of the support structure and a part of the recess on the side remote from the engaging part, in which recess the engaging part is axially displaceable. This construction means that length variation of the plastic guide profile relative to the support structure does not result in build-up of stress in the plastic guide profile. The engaging part will after all displace in the guide profile when there is such a relative change in the dimensions. The result is that a controllable orientation of the plastic guide profile remains possible even in the case of considerable relative change in the dimensions of the guide profile and the support structure.

The orientation of the guide surface of the guide profile is particularly important for proper operation of the guide. It is therefore advantageous when the recess with the engaging part displaceable therein are formed such that the direction of displacement of the engaging part relative to the recess is at least substantially parallel to the guide surface of the plastic guide part. Build-up of stress parallel to the guide surface can in particular be prevented in this way.

A further advantage of the guide according to the invention is that contamination, also at the engaging positions of the support structure on the plastic guide profile, is not possible, or hardly so, owing to the tight fit of the engaging part of the support structure in the recess in the guide profile. Favourable results have been achieved with a slotted space between the engaging part and the inside of the recess (which can also be referred to as tolerance or clearance) of a maximum of 3 mm, preferably less than 1 mm.

It is found in practice that a sufficient strength of the plastic guide profile can be obtained at limited cost when the guide profile is manufactured from a high-molecular polyethylene. It will however generally be necessary here to give the plastic guide profile a relatively voluminous form (for instance beam-like). The support structure can be manufactured from metal.

In a preferred embodiment, the engaging part of the support structure and a recess co-acting therewith in the guide profile are at least substantially cylindrical. A cylinder shape can be manufactured relatively easily (drilling and turning for instance come to mind here) and has a surface which is relatively easy to clean and in which contaminants cannot adhere. Bolts, screws and such fastening means for fastening the profile are unnecessary. A stable support of the guide profile can be obtained when this latter is provided with engaging positions on opposite sides.

The invention also provides an assembled guide provided with a plurality of mutually connecting guides as described above, wherein a plurality of guide profiles are placed connecting with a gap to each other. The free spaces between the guide profiles are provided to compensate length changes in the individual guide profiles without affecting adjacent guide profiles. Advantageous results can be obtained with a gap which can be used for expansion of between 5 and 35 mm between a profile part and a support structure at atmospheric temperature, in particular when guide profiles are applied of high-molecular polyethylene with a length between 200 and 1200 mm. A plurality of profile parts can herein be engaged by a single support structure. This creates a direct connection between the individual profile parts. A particular variant of the assembled guide is provided with the plurality of profile parts which together form a helical guide track. Such a spiral-shaped guide track makes it possible to realize a long transport route in a limited space, which is advantageous for instance in towers for cooling, heating, smoking and/or otherwise conditioning products with a relatively long treatment time.

The invention further provides a device for conditioning products displaceable along a guide track, comprising: an assembled guide as described above, displacing means for displacing the products for conditioning along the guide, a housing at least partially enclosing the assembled guide and the displacing means, and conditioning means for regulating the atmosphere in the housing. The conditioning means can for instance comprise temperature-regulating means. In a particularly advantageous variant, the assembled guide comprises a vertically oriented, helical conveyor track with a housing placed therearound, wherein in the helical conveyor track there can be placed a rotatable core, through rotation of which a conveyor belt carried by the conveyor track can be driven. Such a guide track can advantageously be applied in the meat-processing industry, wherein for instance an endless conveyor track manufactured from metal components is displaced over the assembled guide. The advantages as already described above with reference to the guide according to the invention can thus be realized

BRIEF DESCRIPTION OF THE DRAWINGS

The invention will be further elucidated with reference to the non-limitative exemplary embodiments shown in the following figures, in which.

DETAILED DESCRIPTION OF THE INVENTION

Figure 1A:
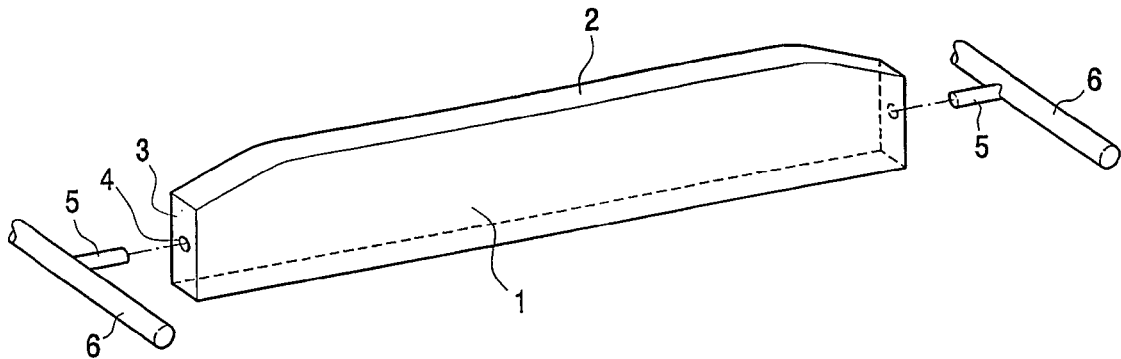
FIG. 1A is a perspective, exploded view of a part of a support structure and a guide profile according to the present invention.
Figure 1B:
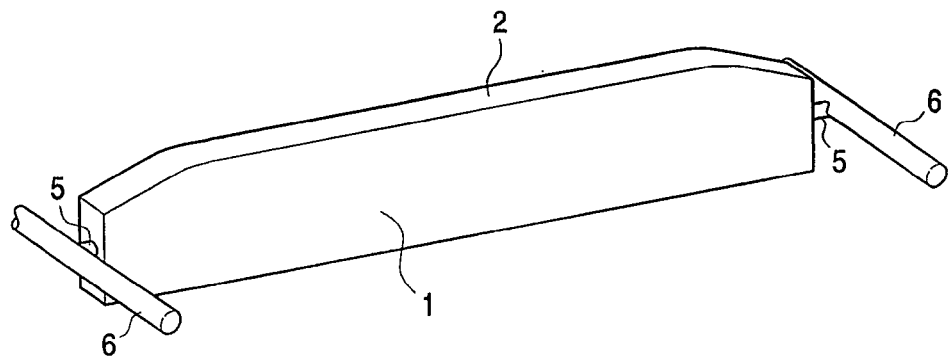
FIG. 1B is a perspective view of the part of the support structure and the guide profile shown in FIG. 1A in assembled state.

FIG. 1A shows a beam-like plastic guide profile 1 provided with a guide surface 2. The end walls 3 of guide profile 1, only one of which is visible in the figure, are provided with cylindrical openings 4 arranged for co-action with cylindrical pins 5 carried by frame parts 6. Openings 4 are given a depth such that guide profile 1 can be pushed so far onto an associated pin 5 with one of the openings 4 that the opposite pin 5 can be pushed into the opening 4 co-acting therewith. A situation is thus obtained as shown in FIG. 1B; guide profile 1 is suspended from pins 5. Pins 5 herein have sufficient space in axial direction in openings 4 to compensate expansion (length increase) of guide profile 1. Conversely, pins 5 penetrate sufficiently far into openings 4 to compensate shrinkage (length decrease) of guide profile 1.

Figure 2:
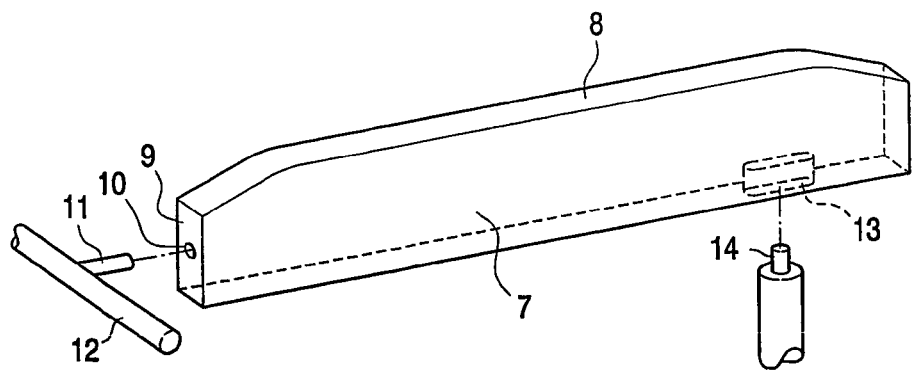
FIG. 2 is a perspective, exploded view of a part of an alternative embodiment of a support structure and a guide profile according to the present invention.

FIG. 2 shows an alternative embodiment variant of a plastic guide profile 7 provided with a guide surface 8 which is provided on an end wall 9 with a recess 10 adapted for co-action with a pin 11 connected to a frame 12 (as in the connection with pins 5 and openings 4 shown in FIGS. 1A and 1B). Guide profile 7 is provided on the underside with a slot-like opening 13 into which a pin 14 fits in a manner such that a change in the length of guide profile 7 is possible without build-up of stress in the guide profile. For this purpose the slot 13 can displace in horizontal direction relative to pin 14.

Figure 3:
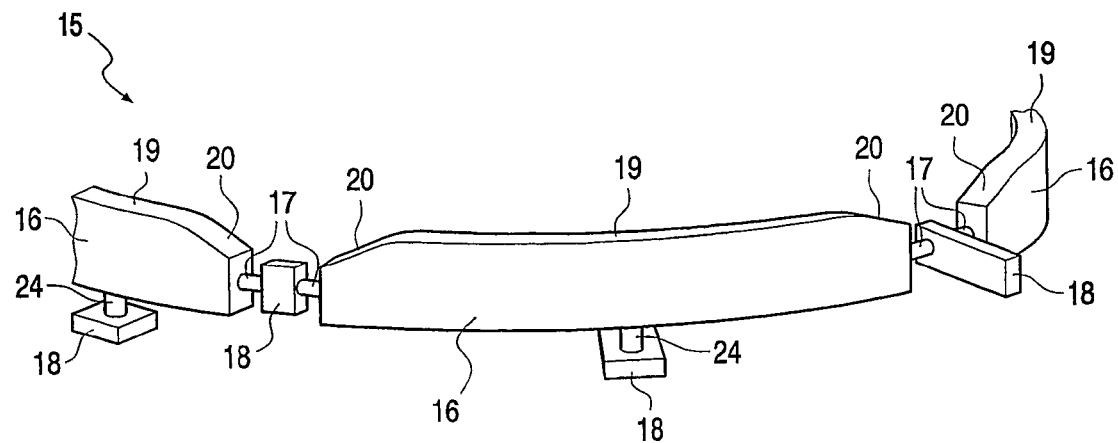
FIG. 3 is a perspective view of a part of an assembled guide according to the present invention in assembled state.

FIG. 3 shows an assembled guide 15 provided with a plurality of successively placed guide profiles 16. Guide profiles 16 are coupled on the end walls to a frame 18 with pins 17 as according to the construction as described with reference to FIGS. 1A and 1B. Profile parts 16 are additionally supported by pins 24 likewise connected to frame 18. Guide profiles 16 are successively placed such that guide surfaces 19 connect to each other (with free interspacing). Guide surfaces 19 are herein formed such that they are provided close to the end walls of guide profiles 16 with chamfered portions 20 sloping toward the end wall. Objects (such as endless conveyor belts in particular) displaced over guide surfaces 19 are prevented (not shown) by means of the chamfered portions 20 from being obstructed by the end walls of guide profiles 16.

Figure 4:
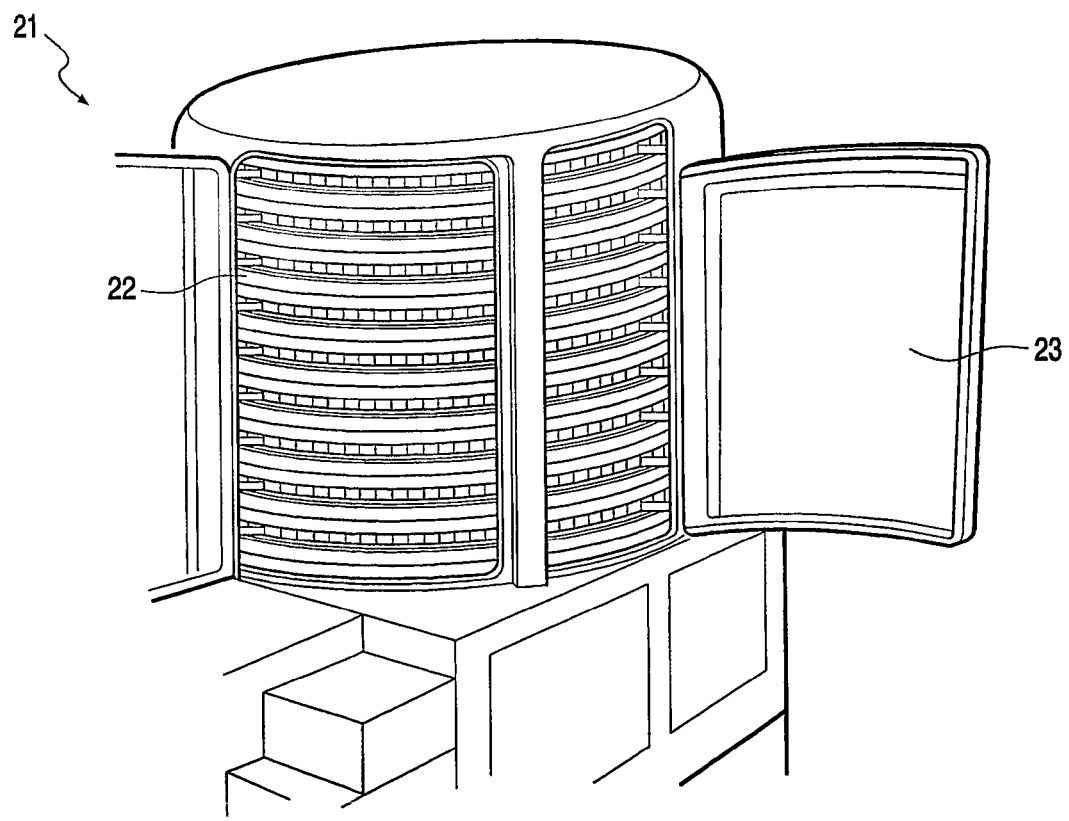
FIG. 4 is a perspective view of a spiral tower according to the present invention.
Figure 5:
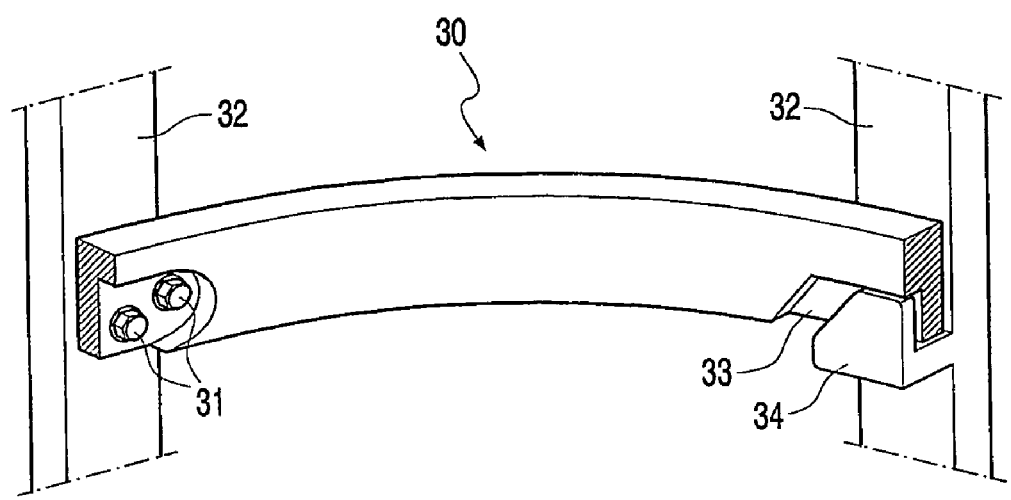
FIG. 5 is a perspective view of yet another embodiment of a support structure and a guide profile according to the present invention.

FIG. 4 shows a tower 21 with a helical conveyor track 22 which is placed in a housing 23 shown opened in the figure. Conveyor track 22 is formed by successively positioned guide profiles as for instance shown in the previous figures. A tower 21 as shown is applied particularly in the food-processing industry for conditioning (half-)products FIG. 5 shows a guide profile 30 which is fastened rigidly on one side by means of bolts 31 to a part of a support structure 32. On the side of guide profile 30 remote from bolts 31 is arranged a recess 33, the top side of which rests on a protrusion 34 forming part of support structure 32. Guide profile 30 can thus slide over protrusion 34 at the position of recess 33.

What is claimed is:

1. Guide for supporting a displaceable object, comprising:
   a plastic guide profile having a guide surface over which displaceable objects can slide directly or via a product carrier, and
   a support structure supporting the guide profile,
   characterized in that the guide profile is engaged at least at two spaced-apart positions by the support structure, at least one engaging position of which consists of a free support of the guide profile on the support structure such that the freely supporting side of the guide profile is displaceable relative to the support structure; and
   wherein the free support of the guide profile on the support structure is formed by a recess in the guide profile in which an engaging part of the support structure engages close-fittingly and displaceably.

2. Guide as claimed in claim 1, characterized in that the guide profile is coupled rigidly on one side to the support structure.

3. Guide as claimed in claim 1, characterized in that the guide profile is provided with a three-dimensional contact surface at the position where it supports freely on the support structure.

4. Guide as claimed in claim 1, characterized in that the support structure is provided with a three-dimensional contact surface at the position where the guide profile supports freely thereon.

5. Guide as claimed in claim 1, characterized in that a free space is enclosed between the engaging part of the support structure and a part of the recess on the side remote from the engaging part, in which recess the engaging part is axially displaceable.

6. Guide as claimed in claim 5, characterized in that the recess with the engaging part displaceable therein is formed such that the direction of displacement of the engaging part relative to the recess is at least substantially parallel to the guide surface.

7. Guide as claimed in claim 1, characterized in that the tight fit of the engaging part of the support structure in the recess in the guide profile leaves free a slotted space between the engaging part and the inside of the recess of a maximum of 3 mm, preferably less than 1 mm.

8. Guide as claimed in claim 1, characterized in that the guide profile is manufactured from a high-molecular polyethylene.

9. Guide as claimed in claim 1, characterized in that the support structure is manufactured from metal.

10. Guide as claimed in claim 1, characterized in that the engaging part of the support structure and the recess co-acting therewith in the guide profile are at least substantially cylindrical.

11. Guide as claimed in claim 1, characterized in that the guide profile is provided on opposite sides with engaging positions.

12. Guide for supporting a displaceable object, comprising:
- a plastic guide profile having a guide surface over which displaceable objects can slide directly or via a product carrier, and
- a support structure supporting the guide profile, characterized in that the guide profile is engaged at least at two spaced-apart positions by the support structure, at least one engaging position of which consists of a free support of the guide profile on the support structure such that the freely supporting side of the guide profile is displaceable relative to the support structure;
- wherein a plurality of guide profiles are placed connecting with a gap to each other; and
- wherein the gap between the profiles is between 5 and 35 mm at atmospheric temperature.

13. Assembled guide as claimed in claim 12, characterized in that the plurality of profile parts are engaged by a single support structure.

14. Assembled guide as claimed in claim 12, characterized in that the plurality of profiles forms a helical guide track.

15. Assembled guide as claimed in claim 12 comprising a device for conditioning products displaceable along a guide track, comprising means for displacing the products for conditioning along the guide,
- a housing at least partially enclosing the assembled guide and the displacing means, and
- conditioning means for regulating the atmosphere in the housing.

16. Device as claimed in claim 15, characterized in that the conditioning means comprise temperature-regulating means.

17. Device as claimed in claim 15, characterized in that the assembled guide comprises a vertically oriented, helical conveyor track with a housing placed the rearound.

18. Device as claimed in claim 17, characterized in that a rotatable core is placed in the helical conveyor track.

19. Device as claimed in claim 15, characterized in that the displacing means comprise a driven endless conveyor track.

* * * * *